United States Patent [19]
Emus, Jr.

[11] Patent Number: 5,113,595
[45] Date of Patent: May 19, 1992

[54] DART BOARD POSITIONING DEVICE
[76] Inventor: Ronald W. Emus, Jr., 86 Concord Rd., Billerica, Mass. 01821
[21] Appl. No.: 629,435
[22] Filed: Dec. 18, 1990
[51] Int. Cl.[5] ............................................. G01B 5/02
[52] U.S. Cl. ...................................... 33/759; 33/760; 33/340
[58] Field of Search ................. 33/DIG. 10, 339, 340, 33/760, 759

[56] References Cited
U.S. PATENT DOCUMENTS

| | | | |
|---|---|---|---|
| 918,869 | 4/1909 | Larsen | 33/340 |
| 1,166,019 | 12/1915 | Taylor et al. | |
| 1,323,018 | 11/1919 | Craddock | |
| 1,369,652 | 2/1921 | Hall | |
| 2,536,447 | 1/1951 | Kirton | |
| 3,568,322 | 3/1971 | Showers | 33/332 |
| 4,274,203 | 6/1981 | Vasile | 33/339 X |

FOREIGN PATENT DOCUMENTS

| | | | |
|---|---|---|---|
| 179531 | 12/1906 | Fed. Rep. of Germany | 33/340 |
| 0090501 | 4/1987 | Japan | 33/760 |
| 9248 | of 1901 | United Kingdom | 33/759 |

OTHER PUBLICATIONS
Ad for "Briefcase Dartboard," *Double Eagle Newsletter*, American Darts Organization (Bellflower, Calif.), vol. 13, No. 4 (Fall '89).

*Primary Examiner*—Harry N. Haroian
*Attorney, Agent, or Firm*—Bradley N. Ruben

[57] ABSTRACT

The invention provides a method and a device for positioning a dart board and an associated throwing line (hockey) without reference to the slope of the floor or the verticality of the wall (on which the board is mounted), or on the planarity of either. The primary advantage of the device is that inaccuracies in the level of the floor and the angle between the floor and the wall do not effect the measurement; another advantage is that the device allows the positioning to be done by a single person. The device includes two measuring lines connected (virtually) at right angles with means for leveling the throwing distance line, means for measuring the board elevation, means for attaching to the board and/or a board mounting bracket, and means for locating the hockey.

19 Claims, 4 Drawing Sheets

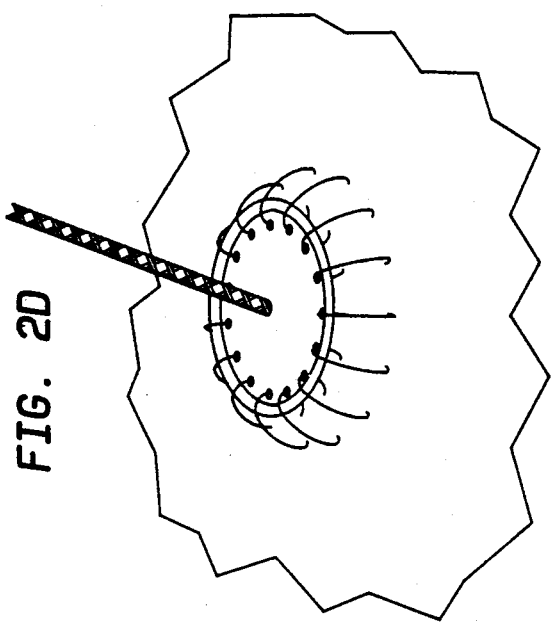
FIG. 2D
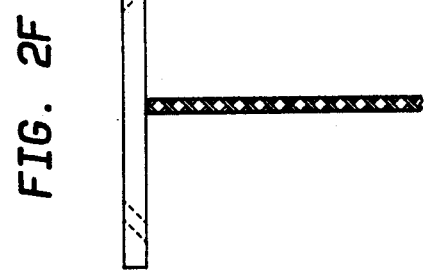
FIG. 2F
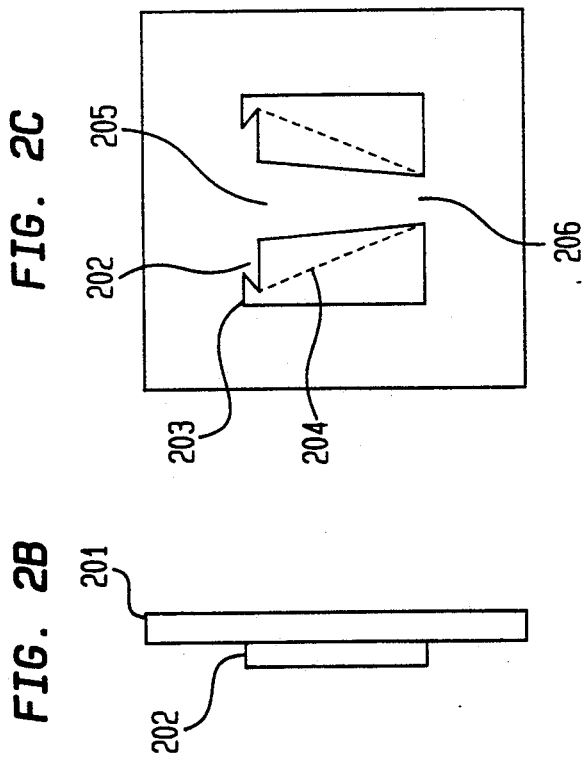
FIG. 2C
FIG. 2B
FIG. 2E
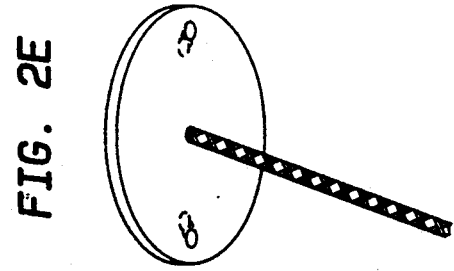

DART BOARD POSITIONING DEVICE

BACKGROUND OF THE INVENTION

1. Field of the Invention

This invention is for a device useful for determining the proper positioning of a dart board from a throwing line, and also for a method for the positioning.

2. State of the Art

Darts is a game played by throwing projectiles (darts) at a target scoring board (the board). The accuracy of a player's throw is effected by the distance and angle from the point of the throw to the board. Accordingly, official dart rules (e.g., those of the Americal Darts Organization, A.D.O.) specify the height of the board from the floor and the distance to the board from point of the throw.

Of these two distances, one distance is the elevation E from the standing surface, the floor, F, to the board, B. More specifically, this distance is the elevation from the hockey, H, the throwing line, to the center of the board, also called the "cork" C. The other distance is a length L from the cork C to a plane elevated from the hockey H.

In practice, the positioning of the board is typically done by first positioning the board to the proper height on a wall W by measuring from the intersection of the floor and the wall to the cork. Next, the position of the throwing line is determined either by measuring along the floor from the wall (accounting for the thickness of the board) to the hockey or by measuring from the cork to the hockey. These techniques assume that the floor is both level and perpendicular to the plane of the wall, and, accordingly, that the distance from the cork to the throwing line is the hypotenuse of a right triangle formed by the floor and the wall. For example, the A.D.O. specifies a board height of 5'8", a distance from the front surface of the board at the floor to the throwing line of 7'9¼", and a diagonal from the cork to the throwing line of 9'7½".

A change in the distance of the throwing line of only a few inches, or even one inch, can significantly effect a player's accuracy. For perspective, the distance across the cork scoring area is about 1¼"; at a distance of 7'9¼" this becomes an angle of about 1.5°. Similarly, around the outside of the scoring area is the double scoring area, two concentric circles with a distance of about ⅜" between them; at the distance of the throwing line the target area between the circles allows for an angle of about 0.5°. (These measurements assume the throw is from a point which forms a line perpendicular to the plane of the game surface of the board face intermediate the borders of the scoring area.)

Precise positioning of the throwing line therefore is critical to the throw of a consistent or professional player. However, the existing system for the positioning of the board and throwing line does assumes the existence of a right angle where the floor meets the wall, and that the floor and wall be perfectly planar.

Accordingly, it would be beneficial to provide a method for more accurately positioning the board and throwing line. It also would be beneficial to provide a device to perform or assist in the performance of that method.

SUMMARY OF THE INVENTION

The present invention provides an improved method for positioning a dart board and hockey (throwing line) by reference to a throwing length and a board elevation, which comprises locating a first line of a specific distance from the cork (the center of the game surface of the board) which extends a level throwing length and locating a second line extending from the end of the specific throwing length distance and having a specified board elevation down to the hockey, wherein the first and second lines form a right angle (90°).

This invention also provides a positioning device useful for performing the improved positioning method, which comprises a first portion including a first line device having attached to one end an attachment device, a leveling device attached along its length, and a free end, and a second portion including a second line device having a plumb device attached to one end and a free end, the first and second portions joined at a right angle to each other at their free ends by a connector device.

BRIEF DESCRIPTION OF THE FIGURES

FIG. 2 depicts an embodiment of a positioning device according to this invention.

FIGS. 2b and 2c depict embodiments of fixtures for attachment to a dart board.

DETAILED DESCRIPTION OF SPECIFIC EMBODIMENTS

The present invention is designed to avoid inaccuracies of positioning the board and the hockey that may be introduced by an unlevel and/or non-vertical floor and/or wall. In particular, this is achieved by inverting the existing system; namely, by measuring the board elevation vertically from the hockey, and by measuring the board distance to the plane formed by the hockey. In the existing system, all of the official distances will be present simultaneously only if the floor is perfectly level and the wall is perfectly vertical and both are perfectly planar. The present system performs the measurement independently of the floor and wall. Thus, effects of deviations in the floor and wall on the measurement are avoided.

The present novel system is not dependent either on the level of the floor or on the verticality of the wall, or on the planarity of either. This freedom from error is critically important to the serious darts player; the height of the dart player is essentially constant, and the present method and device assure that the player will always be positioned in the same place with respect to the game surface of the board.

The positioning device comprises a first portion that includes a first line device 101 in combination with an attachment device 102 and a leveling device 103; the first portion measures the distance L from the cork to the hockey.

The first line device preferably is composed of a wire, fiber, or braided structure. The material of construction preferably is one that does not stretch substantially, such as wire, single or braided synthetic fibers (e.g., 180 lb. test braided DACRON fiber, KEVLAR fiber, and the like); the amount the material stretches effects the measuring accuracy of the device. The line device may be a static structure, such as a folding or telescoping structure; a flexible, non-stretching line device is preferred.

Figure 1:
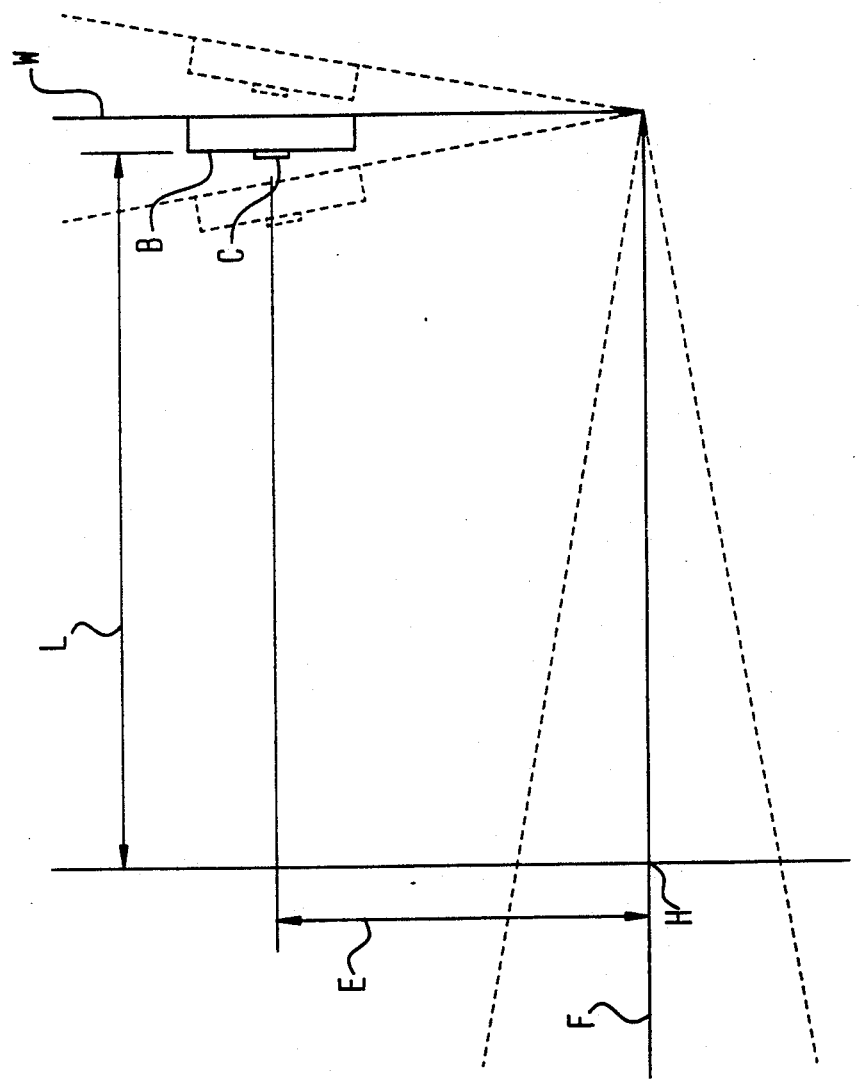
FIG. 1 is a schematic depicting the positioning of a dart board and some possible variations (dotted lines) in the orientation of floor and wall.
Figure 2A:
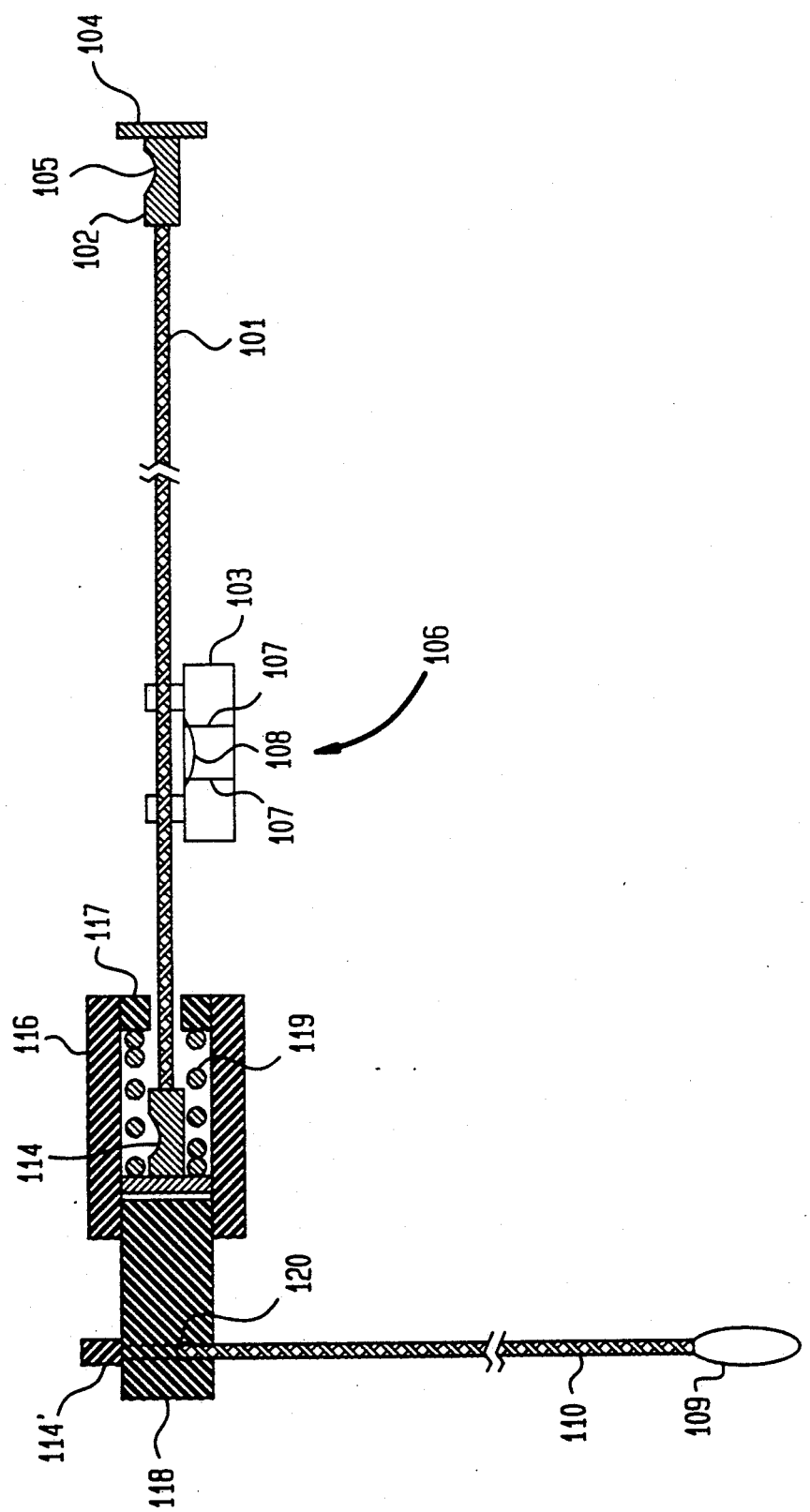
FIG. 2a depicts a bracket for mounting a dart board.
Figure 3:
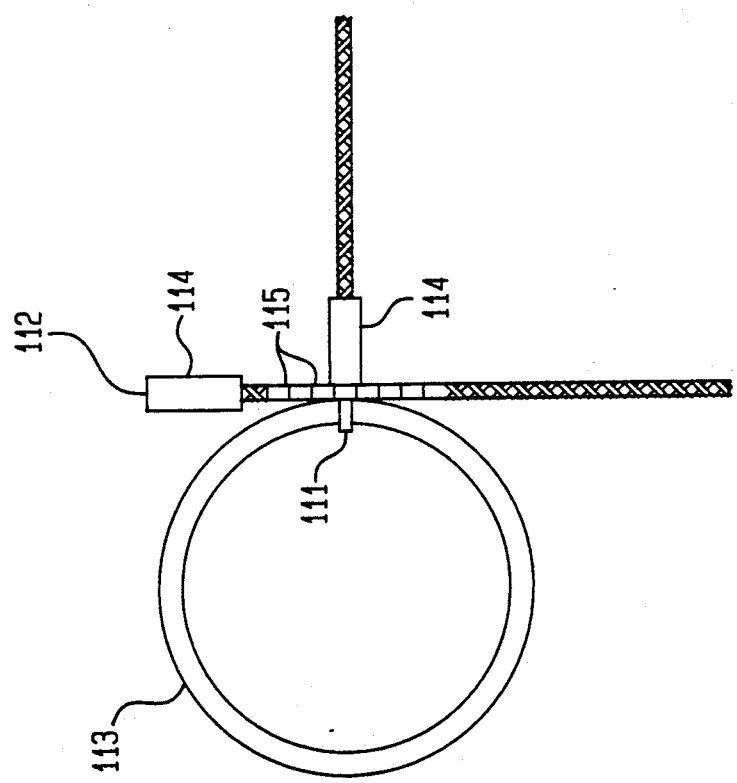
FIG. 3 depicts an embodiment of the connector portion of a positioning device.

Attached to one end of the line device is an attachment device for temporarily affixing one end of the line device to the board, especially at the cork, or from where the board is mounted; it may be held in place by a person. In any embodiment, since the first portion is intended to be the throwing length distance, the entire length of the first portion must account for the location of the attachment device with respect to the game surface (i.e., all or part of the board thickness). The attachment device preferably is a structure having or providing a means of attachment to the board. In one embodiment, as shown in FIG. 2b, the device is plate-like (having a thickness of, for example, ⅛" to ½") having a board contact surface and an opposite surface for attachment of the line device. The plate has two holes drilled therethrough from the board contact surface to the opposite surface, the centers of the holes diverging in the direction towards the board. In operation, the device is secured to the board by placing the device flush against the board and inserting a dart through each hole into the board; the divergence of the holes acts to wedge the device against the front surface of the board. In another embodiment as shown in FIG. 2c, the device includes a thin plate and the board attachment surface includes a plurality of hooks. In operation, the device is placed flush against the board and rotated parallel with the board surface such that the hooks grasp the wires on the board (the scoring areas on the board are separated by metal wires). A preferred embodiment is where attachment is to the mounting bracket for the board. Typically, the non-game side of the board has a screw in the center directly opposite the cork. The screw is embedded in the board to within a small gap, allowing for the head of the screw to be held in a bracket. A generic bracket is shown as a plate 201 having securement means 202, here including two plates 203 shaped with bends 204 and positioned on the plate effective to form an opening 205 diverging to a closing 206 such that the screw is prevented from passing through.

The preferred attachment device on the first line device includes an aluminum rivet having a head 104 and is connected by friction with the first line device by means of a crimp 105. The head of the rivet simulates the screw head and can be mounted in the bracket. Alternatively, the rivet may be attached to the board surface. The attachment device is connected to one end of the first line device; the other end is the free end.

An advantage of the invention is that the board attachment device allows the measurement to be accomplished by a single person at the connector device, alleviating the need for a second person to hold the line device against the board.

The first portion also includes a leveling device. Preferably the leveling device a bubble-type leveler used in conventional levels; the device includes a clear cylinder 106 about 1" to 2" long having gradations 107 along its length and filled with a fluid except for an air bubble 108. An exemplary type device is described in U.S. Pat. No. 1,369,652, the disclosure of which is herein incorporated by reference. In practice, the device to which the bubble-type leveler is attached is adjusted to move the bubble to the center of the bubble-type leveler, thereby indicating that the line device and the line measured are level. The level device is attached to the line device, preferably attached slidably in the proximity of the connector device, described below.

The second portion includes a plumb 109 attached to a second line device 110. The second line device is of the same type as described above. This line device may similarly be of a folding or telescoping design, but is preferably a flexible braided fiber or wire structure. The plumb need not be composed of lead, but is meant to be a weighted device which, in combination with the line device of the second portion, allows it to function as a plumb bob, thereby providing a measurement vertically upward from the hockey. The plumb is attached to one end of the line device by any number of conventional means, such as adhesive; preferably, the plumb had a bore through which the second line device is inserted and is held with a knot at the end. The other end of the second portion is the free end.

The free end of the first portion opposite from the attachment device 111 and the free end of the second portion opposite from the plumb device 112 are joined at a line connector device 113 such that the line devices intersect at a right angle. The line connector device preferably is a small structure to which the first and second portions are attached; for example, a small square or sphere (e.g., ¼" to 1" in diameter) having two bores from the surface intersecting at a right angle in the interior, and the line device of each portion is attached through one hole. A preferred embodiment is a metal ring. The first line device is looped around the ring and then back upon itself, the overlapping portion being permanently maintained by a ferrule 114. Prior to attachment of the ferrule, the second line device is draped tangent to and within the plane of the ring such that it is held within the loop created by the first line device around the metal ring. Accordingly, the second line device will be held in slidably abutting relationship by the first line device against the ring; the ease of sliding will be effected by the how forcefully the looped portion of the first line abuts against the second line passing through the loop. A ferrule is then attached to the free end of the second line device. The line devices may also be secured to the connector and optionally each other by such means as adhesive(s) and knotting.

Preferably, the ferrules are in abutting relationship so that the length of each portion remains constant. If desired, hash marks 115 may be placed on the second line device in the proximity of the connector to allow for measurements for different board heights. The length of the second line device may be longer than the elevation E and the elevation varied by sliding the second line until the desired hash mark is adjacent the first line. Preferably, one hash mark is highlighted showing the "proper" board elevation and all marks are an identified distance (e.g., ½") from each other. In operation, the distance from the floor to the bottom of the plumb, or the excess in distance, can be easily determined by reference to the hash marks; thereafter, the board height may be adjusted accordingly.

More preferably, the connector device is a tensioning device, which includes a tubular casing 116, an annular base 117 fixedly mounted at one end of the casing, and a cylindrical pull cap 118 slidably mounted within and at the other end of the casing. Housed within the casing is a tensioning means, preferably a helical spring 119 disposed with its axis along the bore of the casing. A ferrule 114 at the end of the first line device is fixedly attached to the end portion of the pull cap mounted within the casing such that the line device extends along the axes of the spring and the casing and out through the annular base. The annular base is fixedly mounted to the end of the casing opposite the pull cap and functions as a base for the spring. The spring may be fixedly attached to the base and/or the ferrule.

The preferred 180 lb. test braided DACRON fiber used for the line devices has a stretch of less than about ¼ inch over a length of about 8 feet under a tension of about 20 pounds. When the braided fiber is used in the first (horizontal) portion, the slack is removed at about 2 pounds tension. For the braided DACRON fiber, the spring preferably has a tension of about 3 lb. The tensioning device is held at the casing and pulled away from the board: when the spring is essentially fully compressed against the base it will indicate that the slack in the line has been removed and that the measurement can then be taken.

A portion of the pull cap extends out from the casing and has a vertical bore 120 through which the second line device 119 is mounted. The second line device includes a securement device 114' which functions as do the ferrules previously described, to secure the second line device to the connector device. The tensioning device may be designed such that when the spring is essentially fully compressed the casing may or may not abut against the ferrule 114'.

The function of the connector device is to allow the lines of the first and second portions to intersect at a right angle. Accordingly, in another embodiment, the line devices of the first and second portions are integral, a unitary line portion, and the position along the length of the single line device where the connector device would have been attached is simply a marking or a knot around a metal ring (analogous to the embodiment shown in the figure).

The "length" of the first portion is the distance from the board to the throwing line, and the "length" of the second portion is the board height. In construction, the length of the first portion is measured from the end of the attachment device to the intersection, or virtual intersection, of the first and second portions. The measurement may account for any portion of the board thickness the first portion may virtually pass through due to the means of attachment. For example, when the attachment device attaches the first portion to the board mounting bracket, the entire board thickness may be taken into account. The length of the second portion is measured from the intersection (or virtual intersection) of the first and second portions to the terminal end of the plumb device. Therefore, the method of manufacture must account for the operation of the attachment device and the characteristics of the connector device.

When utilizing a tensioning device as the connector device, the "length" of the first line device is determined after the line is placed in tension using the tensioning device; the measured distance thus provides the location for placement of the vertical bore through which the second line device is secured.

In operation, the user of the device attaches the first portion to the board with the attachment device, grasps the connector device, moves backwards pulling the line device of the first portion taut, and manually adjusts the height of the connector device until the level device indicates that the first portion is level. The distance from the terminal end of the plumb device to the floor is the height by which the board must be adjusted. The board is then repositioned, the measurement method is repeated, and the iterative measurement process is continued until the plumb device just contacts the floor. The point on the floor where the end of the plumb just contacts the floor is where the hockey is located. If attachment is made to a bracket for holding the board, then the invention is also useful for determining solely the height of the board; the elevation of the floor should not vary significantly over a distance equivalent to the thickness of the board.

Various modifications and additions may be made to the invention, and such are meant to be within the scope and spirit of the invention as defined by the claims.

What is claimed is:

1. A method for positioning a dart board and a throwing line on a floor by reference to a board elevation and a throwing line distance, comprising the steps of:
   a. locating a first line level from the front surface of the board extending to a free end;
   b. locating a second line vertically downward from the free end;
   wherein the length of the first line is equal to the throwing distance, the length of the second line is equal to the board elevation, the (virtual) junction of the first and second lines forming a right angle; and the junction of the second line and the floor identifying the throwing line; and optionally
   c. adjusting the board height; and then optionally
   d. performing any or all of the foregoing steps as necessary to properly position the board with reference to the throwing line and the board elevation.

2. A device for positioning a dart board and a hockey by reference to a board elevation and a throwing distance, comprising:
   a first portion having in combination board attachment means, leveling means, and a substantially non-stretching first line device having an attachment end and a free end, the board attachment means connected to the line device at the attachment end;
   a second portion having in combination a plumb device having a terminal end, and a substantially non-stretching second line device having one end attached to the plumb device and a free end; and
   means for connecting the free end of each portion at substantially a right angle so that the distance from the (virtual) intersection of the first and second line devices to the board is the throwing distance and the distance from the (virtual) intersection to the terminal end of the plumb device is the board elevation.

3. The device as defined by claim 2, wherein the line device is composed of a synthetic fiber.

4. The device as defined by claim 3, wherein the first and second line devices are comprised of substantially non-stretching synthetic fiber.

5. The device as defined by claim 2, wherein the board attachment means includes a plate.

6. The device as defined by claim 5, wherein the plate includes two bores having axes which diverge away from the line device.

7. The device as defined by claim 5, wherein the board attachment means includes a board contact surface containing a plurality of hook-like structures.

8. The device as defined by claim 2, wherein the leveling means is fixedly attached to the first line device.

9. The device as defined by claim 2, wherein the leveling means is slidably suspended from the first line device.

10. The device as defined by claim 2, wherein the board attachment means is adapted for attachment to a board mounting device.

11. The device as defined by claim 2, wherein the connecting means includes a spring for applying tension to the first line device.

12. The device as defined by claim 11, wherein the spring is a helical spring.

13. The device as defined by claim 11, wherein the connecting means includes a tubular casing having an axis along which the helical spring is disposed within the casing.

14. A device for positioning a dart board and a hockey by reference to a board elevation and a throwing distance, comprising:
   a first portion including in combination
      a board attachment device,
      a leveling device, and
      a substantially non-stretching first line device having an end attached to the board attachment device and a distant end, the leveling device attached to the line device; and
   a second portion including in combination
      a plumb device, and
      a substantially non-stretching second line device having the plumb device attached to one end and having
      a distant end;
   wherein the first line device and the second line device are an integral line device; and
   c. means for identifying a position on the integral line device having a distance along the first portion equal to the throwing distance and a distance along the second portion equal to the board elevation.

15. The device as defined by claim 14, wherein the line portion is composed of a synthetic fiber.

16. The device as defined by claim 15, wherein the first and second line devices are comprised of substantially non-stretching synthetic fiber.

17. The device as defined by claim 14, wherein the attachment device includes a plate.

18. The device as defined by claim 17, wherein the plate includes two bores having axes which diverge away from the line device.

19. The device as defined by claim 17, wherein the attachment device has a board contact surface containing a plurality of hook-like structures.

* * * * *